(12) United States Patent
Mori et al.

(10) Patent No.: US 9,287,575 B2
(45) Date of Patent: Mar. 15, 2016

(54) FUEL CELL

(71) Applicant: MURATA MANUFACTURING CO., LTD., Nagaokakyo-Shi (JP)

(72) Inventors: Naoya Mori, Nagaokakyo (JP); Kazuhide Takata, Nagaokakyo (JP)

(73) Assignee: MURATA MANUFACTURING CO., LTD., Nasaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/034,244

(22) Filed: Sep. 23, 2013

(65) Prior Publication Data

US 2014/0023955 A1 Jan. 23, 2014

Related U.S. Application Data

(63) Continuation of application No. PCT/JP2012/056505, filed on Mar. 14, 2012.

(30) Foreign Application Priority Data

Mar. 30, 2011 (JP) ................................ 2011-075940

(51) Int. Cl.
*H01M 8/12* (2006.01)
*H01M 8/02* (2006.01)

(52) U.S. Cl.
CPC .......... *H01M 8/1226* (2013.01); *H01M 8/0206* (2013.01); *H01M 8/0228* (2013.01); *H01M 8/0256* (2013.01); *H01M 8/1213* (2013.01); *H01M 2008/1293* (2013.01); *Y02E 60/521* (2013.01); *Y02E 60/525* (2013.01)

(58) Field of Classification Search
USPC ................. 429/468, 469, 482, 486, 508, 509
See application file for complete search history.

(56) References Cited

U.S. PATENT DOCUMENTS

| | | | |
|---|---|---|---|
| 6,183,897 B1* | 2/2001 | Hartvigsen et al. ........... | 429/465 |
| 8,252,478 B2 | 8/2012 | Larsen et al. | |
| 2003/0077498 A1* | 4/2003 | Cable et al. .................... | 429/32 |
| 2003/0082434 A1* | 5/2003 | Wang et al. .................... | 429/40 |
| 2006/0153974 A1 | 7/2006 | Matsuzaki et al. | |
| 2007/0003815 A1 | 1/2007 | Vyas et al. | |
| 2008/0166618 A1* | 7/2008 | Larsen et al. .................. | 429/33 |
| 2008/0254337 A1 | 10/2008 | Akikusa et al. | |
| 2010/0129727 A1* | 5/2010 | Day et al. ...................... | 429/480 |
| 2010/0183952 A1 | 7/2010 | Amarasinghe et al. | |
| 2011/0287341 A1 | 11/2011 | Inoue et al. | |

FOREIGN PATENT DOCUMENTS

| | | |
|---|---|---|
| CN | 101151751 A | 3/2008 |
| EP | 1353391 A1 | 10/2003 |
| EP | 1624521 A1 | 2/2006 |

(Continued)

OTHER PUBLICATIONS

PCT/JP2012/056505, International Search Report, date of mailing Apr. 10, 2012.

(Continued)

*Primary Examiner* — Muhammad Siddiquee
(74) *Attorney, Agent, or Firm* — Arent Fox LLP

(57) ABSTRACT

Provided is a fuel cell having a long product life. In the fuel cell, an interlayer is arranged between a portion of an interconnector which is formed of Ag or an Ag alloy and a first electrode containing Ni. The interlayer is formed of an oxide containing Ni and Ti.

20 Claims, 9 Drawing Sheets

(56) References Cited

FOREIGN PATENT DOCUMENTS

| | | |
|---|---|---|
| JP | 08-287930 | 11/1996 |
| JP | 2011-009065 A | 1/2001 |
| JP | 2008-004314 | 1/2008 |
| JP | 2009-099308 | 5/2009 |
| JP | 2009-205907 A | 9/2009 |
| JP | 2010-503157 A | 1/2010 |
| WO | WO-2004/088783 A1 | 10/2004 |
| WO | WO-2008/028242 A1 | 3/2008 |
| WO | WO-2009/131180 A1 | 10/2009 |

OTHER PUBLICATIONS

PCT/JP2012/056505, Written Opinion, date of mailing.

Extended European search report issued in PCT/JP2012/056505, dated Sep. 24, 2014.

* cited by examiner

FUEL CELL

This is a continuation of application Serial No. PCT/JP2012/056505, filed Mar. 14, 2012, the entire contents of which are incorporated herein by reference.

TECHNICAL FIELD

The present invention relates to a fuel cell. In particular, the present invention relates to a solid oxide fuel, cell.

BACKGROUND ART

In recent years, the attention given to fuel cells as a new energy source has increased. Examples of fuel cells include solid oxide fuel cells (SOFC), molten carbonate fuel cells, phosphoric acid fuel cells and polymer electrolyte fuel cells. Among these fuel cells, solid oxide fuel cells do not necessarily require the use of a liquid component and can be internally modified when a hydrocarbon fuel is used. Therefore, research and development on solid oxide fuel cells has been vigorously conducted.

The solid oxide fuel cell includes a power generating element having a solid oxide electrolyte layer, and a fuel electrode and an air electrode which hold the solid oxide electrolyte layer therebetween. A separator which dividedly forms a channel for supplying a fuel gas is arranged on the fuel electrode. An interconnector for connecting the fuel electrode to outside is provided in the separator. On the other hand, a separator which dividedly forms a channel for supplying an oxidant gas is arranged on the air electrode. An interconnector for connecting the air electrode to outside is provided in the separator.

For example, Patent Document 1 describes, as a constituent material of a fuel electrode, yttria stabilized zirconia (YSZ) containing at least one metal selected from Ni, Cu, Fe, Ru and Pd.

Further, Patent Document 1 describes, as a constituent material of an interconnector, a glass containing an Ag—Pd alloy.

PRIOR ART DOCUMENT

Patent Document

Patent Document 1: WO 2004/088783 A1 Publication

SUMMARY OF THE INVENTION

Problem to be Solved by the Invention

When a fuel electrode is formed of yttria stabilized zirconia containing Ni and the interconnector contains an Ag—Pd alloy as described in Patent Document 1, the electrical connection between the fuel electrode and the interconnector may be degraded with time, so that the product life cannot be made sufficiently long.

The present invention has been devised in view of the situation described above, and an object of the present invention is to provide a fuel cell having a long product life.

Means for Solving the Problem

A fuel cell according to the present invention includes a power generating element, a separator and an interconnector. The power generating element has a solid oxide electrolyte layer, a first electrode and a second electrode. The first electrode is arranged on one principal surface of the solid oxide electrolyte layer. The second electrode is arranged on the other principal surface of the solid oxide electrolyte layer. The separator is arranged on the first electrode. The separator dividedly forms a channel facing the first electrode. The interconnector is connected to the first electrode. The first electrode contains Ni. The interconnector has a portion formed of Ag or an Ag alloy such as an Ag—Pd alloy. The fuel cell according to the present invention further includes an interlayer. The interlayer is arranged between the portion formed of Ag or Ag alloy and the first electrode. The interlayer is formed of an oxide containing Ni and Ti.

In a specific aspect of the fuel cell according to the present invention, the interlayer contains a $NiTiO_3$ crystal phase during manufacturing of the fuel cell.

In another specific aspect of the fuel cell according to the present invention, the interlayer further contains a NiO crystal phase during manufacturing of the fuel cell.

In yet another specific aspect of the fuel cell according to the present invention, the molar ratio of Ni and Ti (Ni:Ti) in the interlayer is in a range of 62:38 to 95:5.

In a further specific aspect of the fuel cell according to the present invention, the first electrode is formed of yttria stabilized zirconia containing Ni, scandia stabilized zirconia containing Ni, Ni-containing ceria doped with Gd or Ni-containing ceria doped with Sm.

In still another aspect of the fuel cell according to the present invention, the interconnector has a portion formed of an Ag—Pd alloy.

Effect of the Invention

According to the present invention, a fuel cell having a long product life can be provided.

DESCRIPTION OF THE INVENTION

Figure 1:
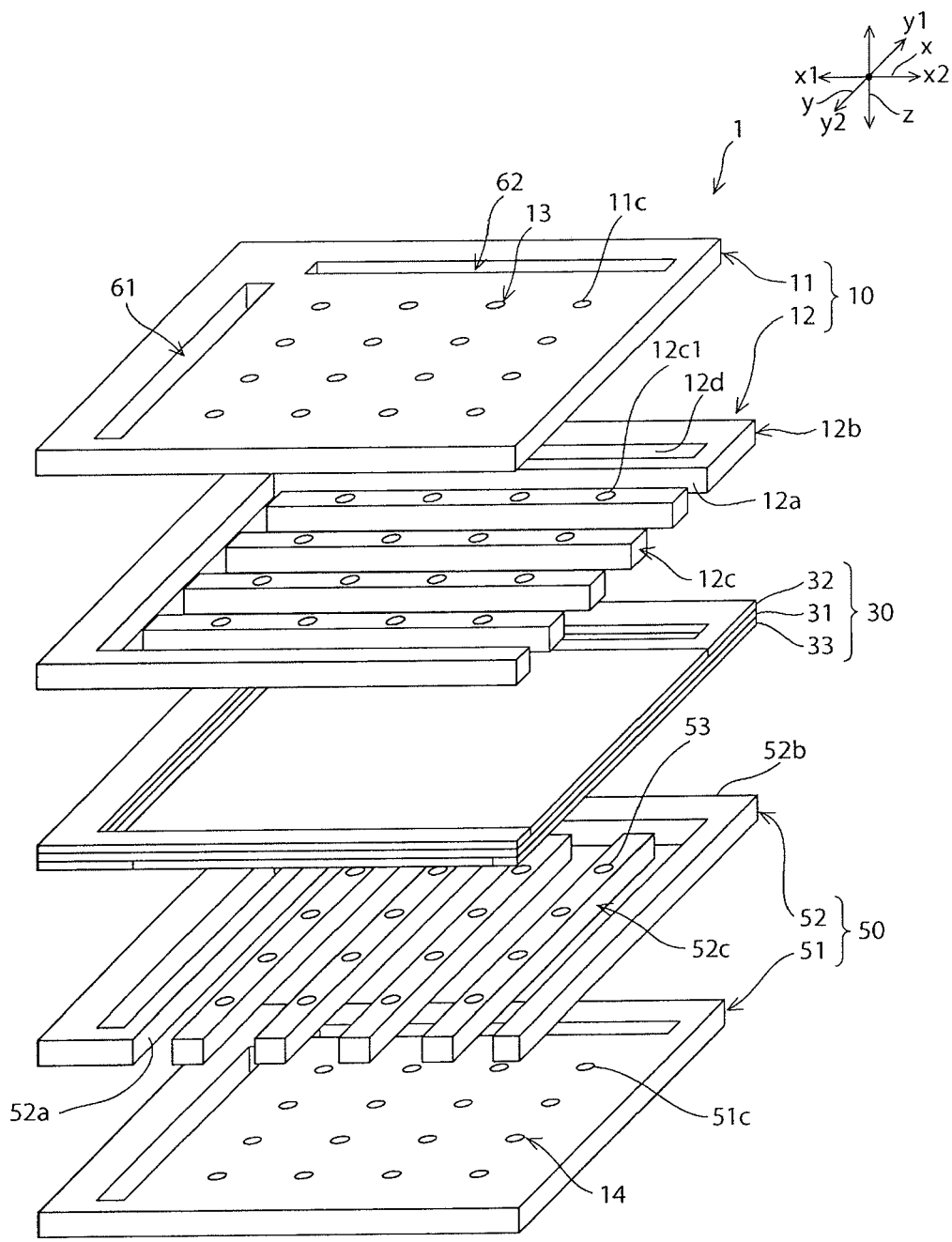
FIG. 1 is a schematic exploded perspective view of a fuel cell according to a first embodiment.

One example of a preferred embodiment of carrying out the present invention will be described below. It is to be noted that any embodiment described below is merely illustrative, and the present invention is in no way limited thereto.

In each drawing referred to in any embodiment, members having substantially the same function are denoted by the same symbols. The drawings referred to in embodiments are schematically described, and the ratio of dimensions, etc., of an object in the drawing may be different from the ratio of dimensions, etc., of the actual object. Dimension ratios of an object may be different between drawings. A specific dimension ratio, and the like, of an object should be inferred by considering the descriptions below.

First Embodiment

Figure 2:
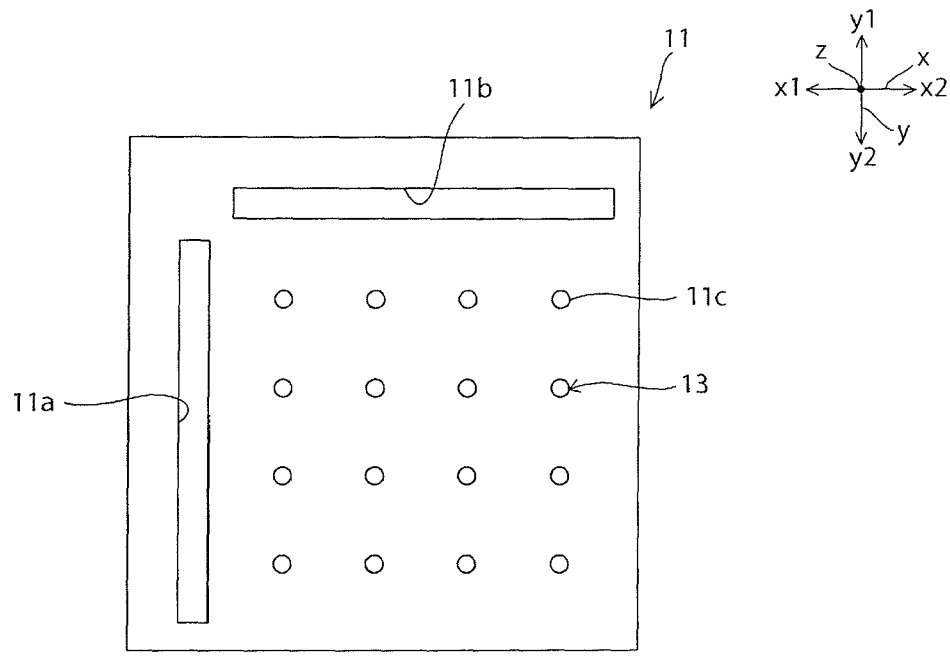
FIG. 2 is a schematic plan view of a first separator body in the first embodiment.
Figure 3:
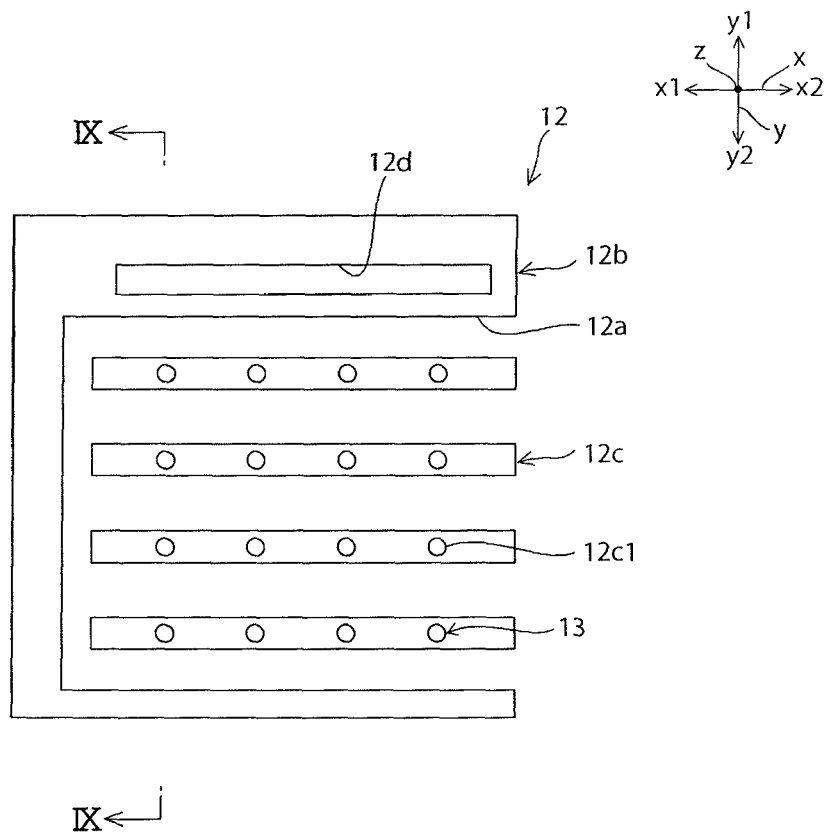
FIG. 3 is a schematic plan view of a first channel forming member in the first embodiment.
Figure 4:
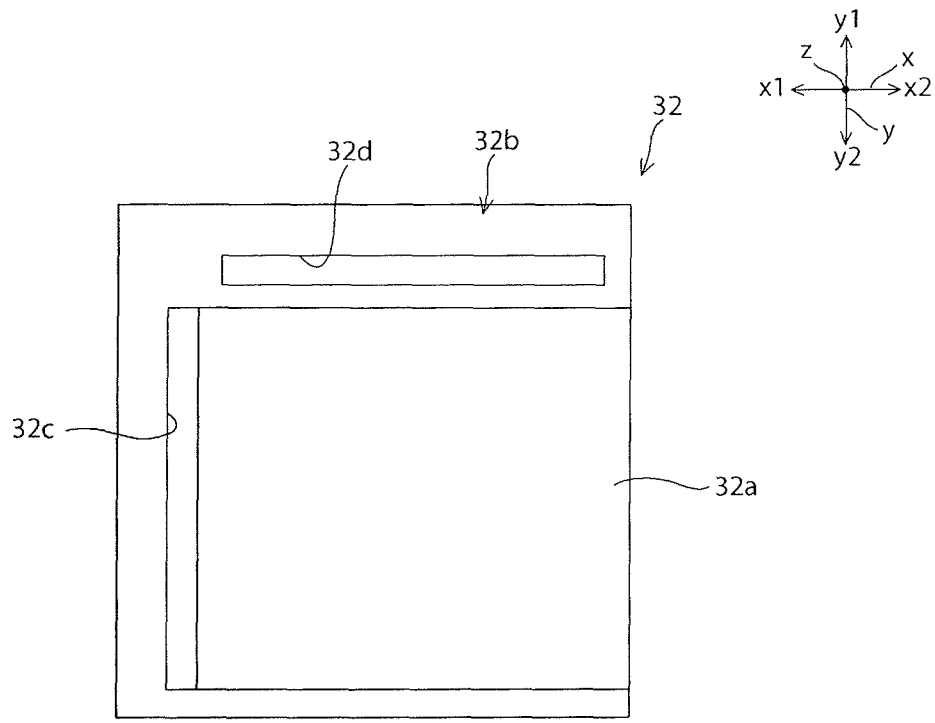
FIG. 4 is a schematic plan view of an air electrode layer in the first embodiment.
Figure 5:
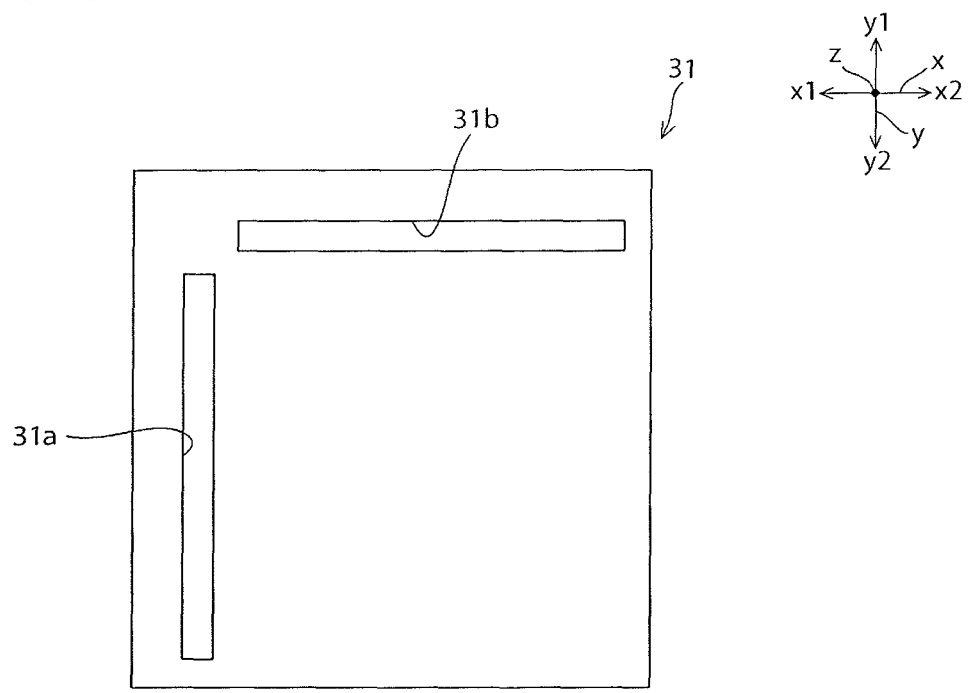
FIG. 5 is a schematic plan view of a solid oxide electrolyte layer in the first embodiment.
Figure 6:
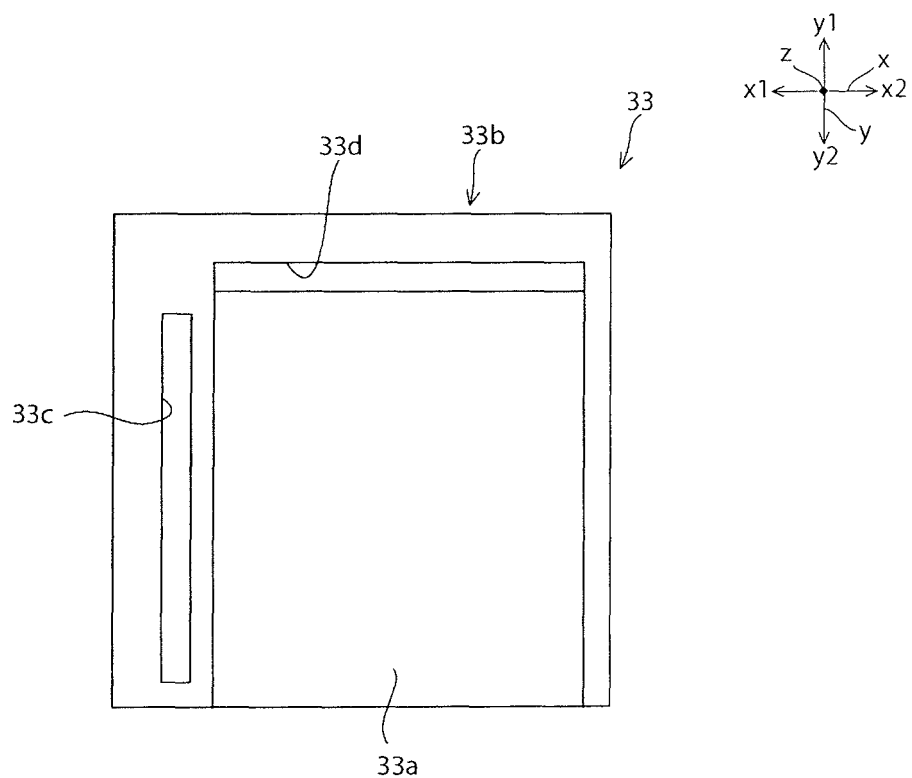
FIG. 6 is a schematic plan view of a fuel electrode layer in the first embodiment.
Figure 7:
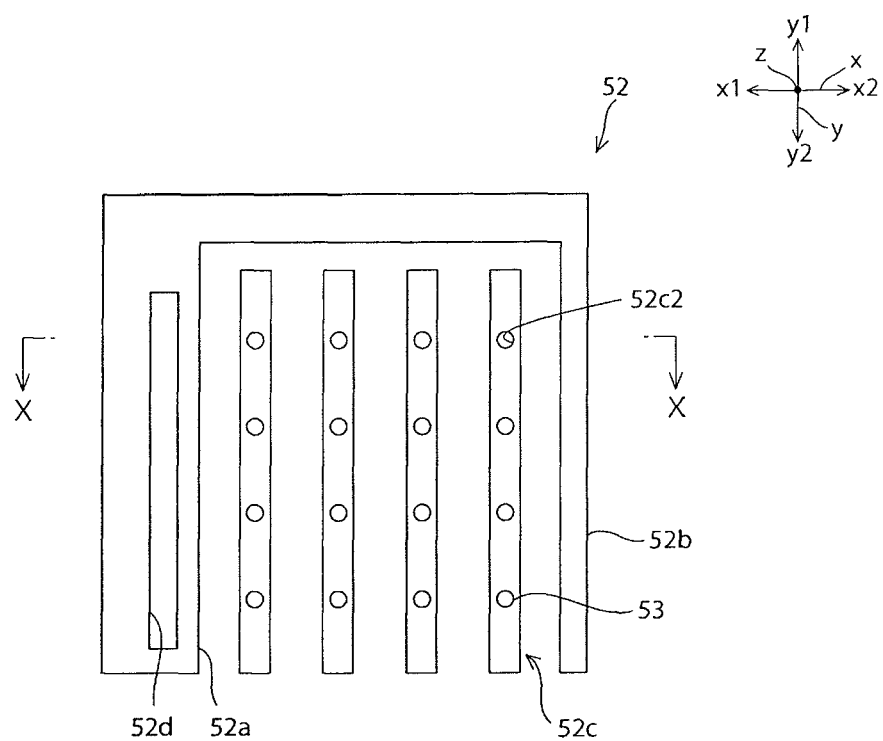
FIG. 7 is a schematic plan view of a second channel forming member in the first embodiment.
Figure 8:
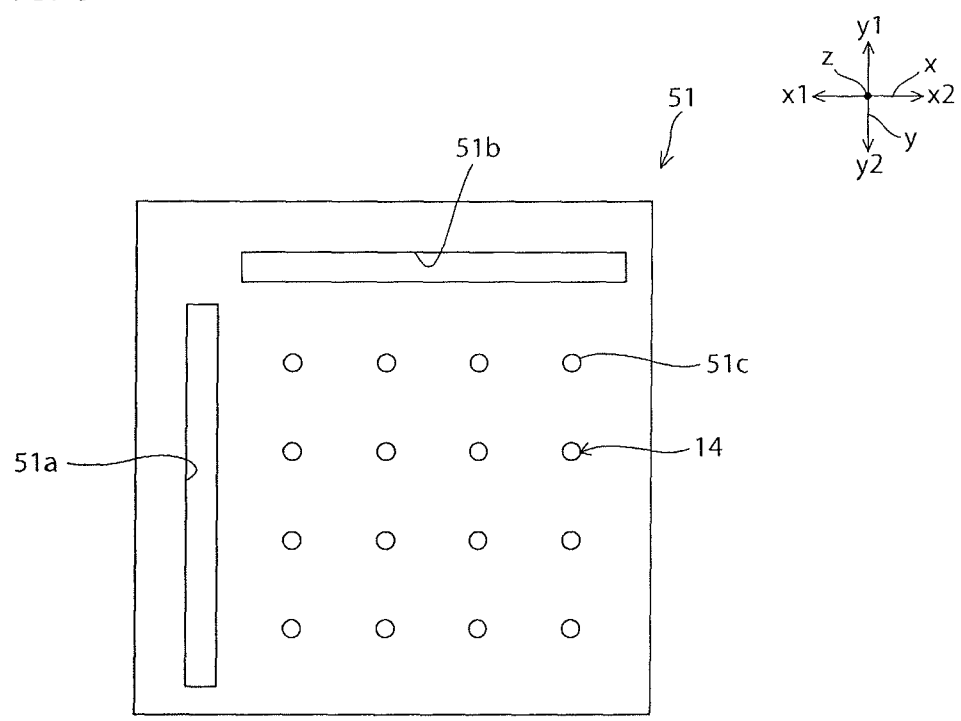
FIG. 8 is a schematic plan view of a second separator body in the first embodiment.
Figure 9:
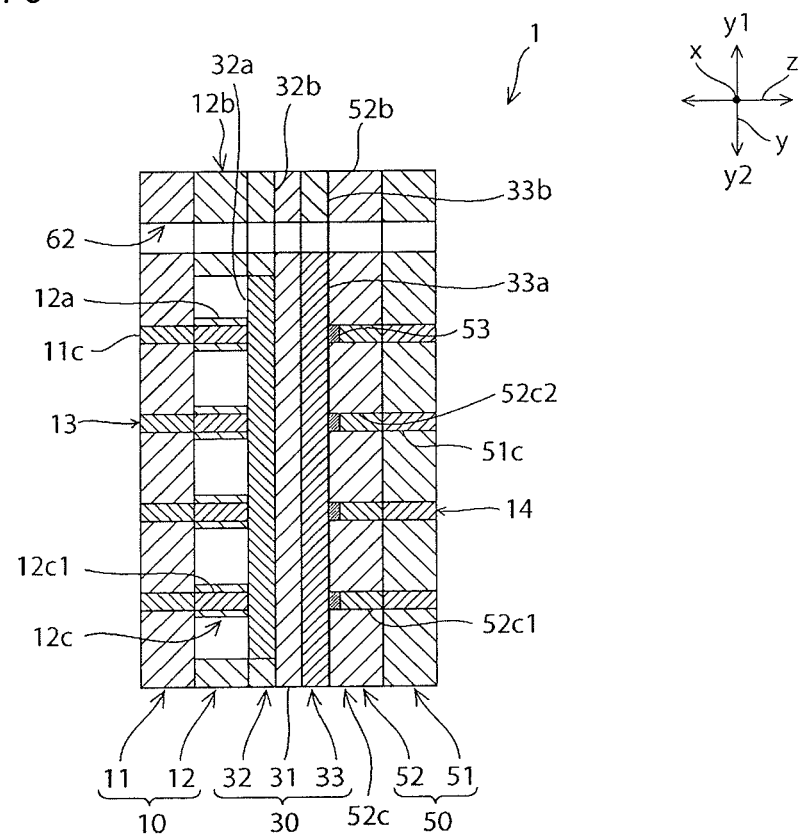
FIG. 9 is a schematic sectional view of the fuel cell in the line IX-IX in FIG. 3.
Figure 10:
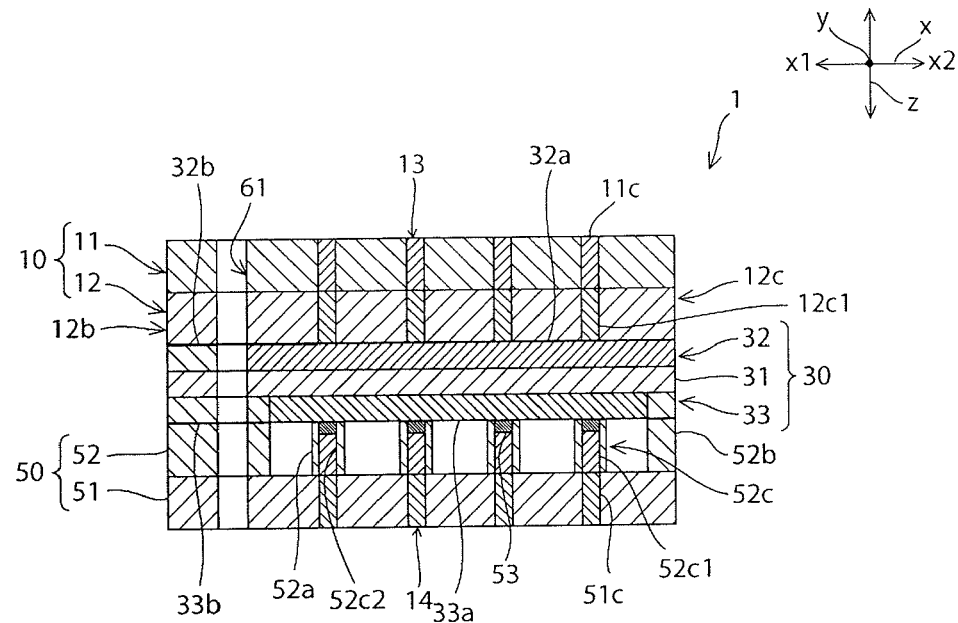
FIG. 10 is a schematic sectional view of the fuel cell in the line X-X in FIG. 7.

FIG. 1 is a schematic exploded perspective view of a fuel cell according to a first embodiment. FIG. 2 is a schematic plan view of a first separator body in the first embodiment. FIG. 3 is a schematic plan view of a first channel forming member in the first embodiment. FIG. 4 is a schematic plan view of an air electrode layer in the first embodiment. FIG. 5 is a schematic plan view of a solid oxide electrolyte layer in the first embodiment. FIG. 6 is a schematic plan view of a fuel electrode layer in the first embodiment. FIG. 7 is a schematic plan view of a second channel forming member in the first embodiment. FIG. 8 is a schematic plan view of a second separator body in the first embodiment. FIG. 9 is a schematic sectional view of the fuel cell in the line IX-IX in FIG. 3. FIG. 10 is a schematic sectional view of the fuel cell in the line X-X in FIG. 7.

As shown in FIG. 1, FIG. 9 and FIG. 10, a fuel cell 1 of this embodiment includes a first separator 10, a power generating element 30 and a second separator 50. In the fuel cell 1, the first separator 10, the power generating element 30 and the second separator 50 are laminated in this order.

The fuel cell 1 of this embodiment includes only one power generating element 30. However, the present invention is not limited to this configuration. For example, the fuel cell 1 of the present invention may include a plurality of power generating elements. In that case, adjacent power generating elements are isolated from each other by the separator.

Power Generating Element 30

The power generating element 30 is a portion where an oxidant gas supplied from an oxidant gas channel (manifold for oxidant gas) 61 and a fuel gas supplied from a fuel gas channel (manifold for fuel gas) 62 react with each other to generate power. The oxidant gas can be formed from, for example, an oxygen-containing gas such as air or oxygen gas. The fuel gas may be a gas containing a hydrogen gas, or a hydrocarbon gas such as a carbon monoxide gas, etc.

Solid Oxide Electrolyte Layer 31

The power generating element 30 includes a solid oxide electrolyte layer 31. The solid oxide electrolyte layer 31 is preferably one having high ionic conductivity. The solid oxide electrolyte layer 31 can be formed from, for example, stabilized zirconia or partially stabilized zirconia. Specific examples of stabilized zirconia include 10 mol % yttria stabilized zirconia (10YSZ) and 11 mol % scandia stabilized zirconia (11ScSZ). A specific example of partially stabilized zirconia is 3 mol % yttria partially stabilized zirconia (3YSZ). The solid oxide electrolyte layer 31 can also be formed from, for example, a ceria-based oxide doped with Sm, Gd and the like, or a perovskite type oxide, such as $La_{0.8}Sr_{0.2}Ga_{0.8}Mg_{0.2}O_{(3-\delta)}$ which has $LaGaO_3$ as a base and in which La and Ga are partially substituted with Sr and Mg, respectively.

Through holes 31a and 31b forming parts of channels 61 and 62 are formed in the solid oxide electrolyte layer 31 as shown in FIG. 5.

The solid oxide electrolyte layer 31 is held between an air electrode layer 32 and a fuel electrode layer 33. That is, the air electrode layer 32 is formed on one principal surface of the solid oxide electrolyte layer 31, and the fuel electrode layer 33 is formed on the other principal surface.

Air Electrode Layer 32

As shown in FIG. 4, the air electrode layer 32 has an air electrode 32a and a peripheral portion 32b. Through holes 32c and 32d forming parts of channels 61 and 62 are formed in the peripheral portion 32b.

The air electrode 32a is a cathode. In the air electrode 32a, oxygen captures electrons to form oxygen ions. The air electrode 32a is preferably one that is porous, has high electron conductivity and is resistant to a solid-solid reaction with the solid oxide electrolyte layer 31 etc. at a high temperature. The air electrode 32a can be formed from, for example, scandia stabilized zirconia (ScSZ), ceria doped with Gd, indium oxide doped with Sn, a $PrCoO_3$-based oxide, a $LaCoO_3$-based oxide, a $LaFeO_3$-based oxide, a $LaCoFeO_3$-based oxide or a $LaMnO_3$-based oxide. Specific examples of the $LaMnO_3$-based oxide include $La_{0.8}Sr_{0.2}MnO_3$ (common name: LSM) and $La_{0.6}Ca_{0.4}MnO_3$ (common name: LCM).

The peripheral portion 32b can be formed from, for example, a material similar to that of first and second separator bodies 11 and 51 described below.

Fuel Electrode Layer 33

As shown in FIG. 6, the fuel electrode layer 33 has a fuel electrode 33a and a peripheral portion 33b. Through holes 33c and 33d forming parts of channels 61 and 62 are formed in the peripheral portion 33b.

The fuel electrode 33a is an anode. In the fuel electrode 33a, oxygen ions and a fuel gas react with each other to release electrons. The air electrode 33a is preferably one that is porous, has high electron conductivity and resists undergoing a solid-solid reaction with the solid oxide electrolyte layer 31 etc. at a high temperature.

The fuel electrode 33a contains Ni. Specifically, the fuel electrode 33a can be formed from, for example, yttria stabilized zirconia containing Ni, scandia stabilized zirconia containing Ni (it may also be cermet), Ni-containing ceria doped with Gd or Ni-containing ceria doped with Sm.

The content of Ni in the fuel electrode 33a may be, for example, about 40% by mass to 80% by mass in terms of an oxide.

First Separator 10

As shown in FIG. 1, FIG. 9 and FIG. 10, the first separator 10 is arranged on the air electrode layer 32 of the power generating element 30. The first separator 10 functions to form a channel 12a for supplying to the air electrode 32a an oxidant gas supplied from the oxidant gas channel 61. In a fuel cell including a plurality of power generating elements, the first separator also has a function to separate fuel and oxidant gases.

The first separator 10 has a first separator body 11 and a first channel forming member 12. The first separator body 11 is arranged on the air electrode 32a. Through holes 11a and 11b forming parts of channels 61 and 62 are formed in the first separator body 11.

The first channel forming member 12 is arranged between the first separator body 11 and the air electrode layer 32. The first channel forming member 12 has a peripheral portion 12b and a plurality of linear projections 12c. A through hole 12d forming part of the fuel channel 62 is formed in the peripheral portion 12b.

Each of a plurality of linear projections 12c is provided so as to protrude toward the air electrode layer 32 side from a surface of the first separator body 11 on the air electrode layer 32 side. Each of the plurality of linear projections 12c is provided along an x direction. A plurality of linear projections 12c are arranged at intervals from one another along a y direction. The channel 12a is dividedly formed between adjacent linear projections 12c and between the linear projection 12c and the peripheral portion 12b.

The materials of the first separator body 11 and the first channel forming member 12 are not particularly limited. Each of the first separator body 11 and the first channel forming member 12 can be formed from, for example, stabilized zirconia or partially stabilized zirconia. Each of the first separator body 11 and the first channel forming member 12 can also be formed from, for example, a conductive ceramic such as lanthanum chromite containing a rare earth metal, or an insulating ceramic such as $MgO/MgAl_2O_4$ or $SrTiO_3/Al_2O_3$.

A plurality of via hole electrodes 12c1 are embedded in each of a plurality of linear projections 12c. The plurality of via hole electrodes 12c1 are formed so as to extend through a plurality of linear projections 12c in a z direction. In the first separator body 11, a plurality of via hole electrodes 11c are formed at positions corresponding to a plurality of via hole electrodes 12c1. The plurality of via hole electrodes 11c are formed so as to extend through the first separator body 11. The plurality of via hole electrodes 11c and via hole electrodes 12c1 form a plurality of interconnectors 13 extending from a surface of the linear projection 12c on a side opposite to the first separator body 11 to a surface of the first separator body 11 on a side opposite to the linear projection 12c.

The interconnector 13 may be formed integrally with the first separator 10. That is, the first separator 10 may also function as an interconnector.

The materials of the via hole electrode 11c and the via hole electrode 12c1 are not particularly limited. Each of the via hole electrode 11c and the via hole electrode 12c1 can be formed from, for example, LSM.

Second Separator 50

The second separator 50 is arranged on the fuel electrode layer 33 of the power generating element 30. The second separator 50 functions to form a channel 52a for supplying to the fuel electrode 33a a fuel gas supplied from the fuel gas channel 62. In a fuel cell including a plurality of power generating elements, the second separator also has a function to separate the fuel and oxidant gases.

The second separator 50 has a second separator body 51 and a second channel forming member 52. The second separator body 51 is arranged on the fuel electrode 33a. Through holes 51a and 51b forming parts of channels 61 and 62 are formed in the second separator body 51.

The second channel forming member 52 is arranged between the second separator body 51 and the fuel electrode layer 33. The second channel forming member 52 has a peripheral portion 52b and a plurality of linear projections 52c. A through hole 52d forming part of the fuel gas channel 62 is formed in the peripheral portion 52b.

Each of a plurality of linear projections 52c is provided so as to protrude toward the fuel electrode layer 33 side from a surface of the second separator body 51 on the fuel electrode layer 33 side. Each of the plurality of linear projections 52c is provided along a y direction perpendicular to a direction in which the linear projection 52c extends. A plurality of linear projections 52c are arranged at intervals from one another along an x direction. The channel 52a is dividedly formed between adjacent linear projections 52c and between the linear projection 52c and the peripheral portion 52b. Thus, the direction in which the channel 52a extends is orthogonal to the direction in which the channel 12a extends.

The materials of the second separator body 51 and the second channel forming member 52 are not particularly limited. Each of the second separator body 51 and the second channel forming member 52 can be formed from, for example, stabilized zirconia or partially stabilized zirconia. Each of the second separator body 51 and the second channel forming member 52 can also be formed from, for example, a conductive ceramic such as lanthanum chromite containing a rare earth metal, or an insulating ceramic such as $MgO/MgAl_2O_4$ or $SrTiO_3/Al_2O_3$.

As shown in FIG. 9 and FIG. 10, a plurality of via hole electrodes 52c1 are embedded in each of a plurality of linear projections 52c. In the second separator body 51, a plurality of via hole electrodes 51c are formed at positions corresponding to a plurality of via hole electrodes 52c1. A plurality of via hole electrodes 51c are electrically connected to a plurality of via hole electrodes 52c1. A plurality of via hole electrodes 51c are formed so as to extend through the second separator body 51. The plurality of via hole electrodes 51c and via hole electrodes 52c1 form an interconnector 14 which connects the fuel electrode 33a to outside.

The interconnector 14 may be formed integrally with the second separator 50. That is, the second separator 50 may also function as an interconnector.

The interconnector 14 has a portion formed of Ag or an Ag alloy. In this embodiment, specifically, the interconnector 14 has a portion formed of an Ag alloy. More specifically, the whole interconnector 14 is formed of an Ag—Pd alloy. Therefore, the interconnector 14 has high gas barrier performance.

In this embodiment, an interlayer 53 is arranged between the interconnector 14 and the fuel electrode 33a. Specifically, the interlayer 53 is arranged at an end on the fuel electrode 33a side of a via hole 52c2 formed in the linear projection 52c. The interconnector 14 and the fuel electrode 33a are insulated from each other by the interlayer 53.

Interlayer 53

The interlayer 53 is formed of an oxide containing Ni and Ti. The molar ratio of Ni and Ti (Ni:Ti) in the interlayer 53 is preferably 62:38 to 95:5, more preferably 71:29 to 91:9.

In this embodiment, the interlayer 53 has different properties, depending on whether power generation is being performed or not being performed. The interlayer 53 contains a $NiTiO_3$ crystal phase during preparation of the fuel cell 1. The interlayer 53 further contains a NiO crystal phase during manufacturing of the fuel cell 1.

On the other hand, NiO is reduced to metallic Ni during power generation where the temperature is high and a fuel gas is supplied. Therefore, the interlayer 53 is in a state during power generation where it is formed of a mixture of metallic Ni and titanium oxide.

The interlayer 53 can be formed by sintering a nickel oxide powder such as a NiO powder and a titanium oxide powder such as a $TiO_2$ powder. The mixing ratio of the NiO powder and the $TiO_2$ powder ($NiO:TiO_2$) is preferably 60:40 to 95:5, more preferably 70:30 to 90:10 in terms of % by mass.

When a fuel electrode containing Ni and an interconnector containing Ag or an Ag alloy are brought into direct contact with each other to electrically connect the fuel electrode and the interconnector, the product life of a fuel cell decreases. Specifically, the voltage drops abruptly during power generation.

In contrast, the interlayer 53 formed of an oxide containing Ni and Ti is arranged between the fuel electrode 33a and the interconnector 14 in this embodiment. Therefore, an abrupt voltage drop during power generation can be suppressed. As a result, a long product life can be achieved. The reason for this is uncertain, but is thought to be that when an interlayer formed of an oxide containing Ni and Ti is interposed between the fuel electrode 33a and the interconnector 14, bonding between the fuel electrode 33a and the interconnector 14 is stabilized in an operation environment of a fuel cell.

In this embodiment, the molar ratio of Ni and Ti (Ni:Ti) in the interlayer 53 is 62:38 to 95:5. Therefore, the electric resistance of the interlayer 53 can be reduced to a level causing no problem in practical use. Accordingly, a voltage drop resulting from provision of the interlayer 53 can be suppressed. The molar ratio of Ni and Ti (Ni:Ti) in the interlayer 53 is preferably 71:29 to 91:9 for more effectively suppressing a voltage drop resulting from provision of the interlayer 53.

Other examples of preferred embodiments of carrying out the present invention will be described below. In the descriptions below, members having substantially the same functions as those in the first embodiment are denoted by the same symbols, and explanations thereof are omitted.

Second to Fourth Embodiments

Figure 11:
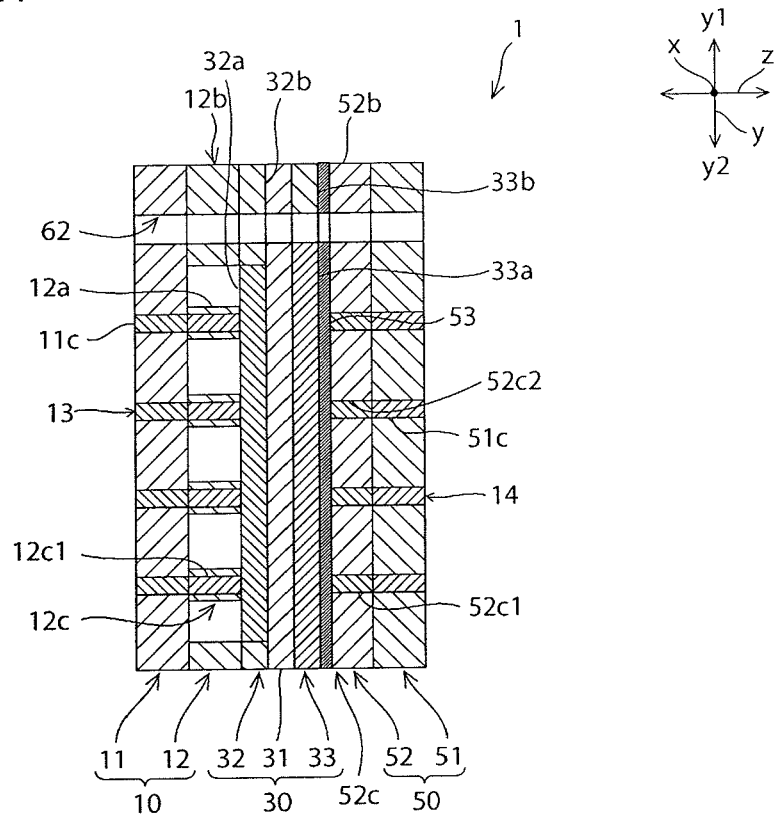
FIG. 11 is a schematic sectional view of a fuel cell according to a second embodiment.
Figure 12:
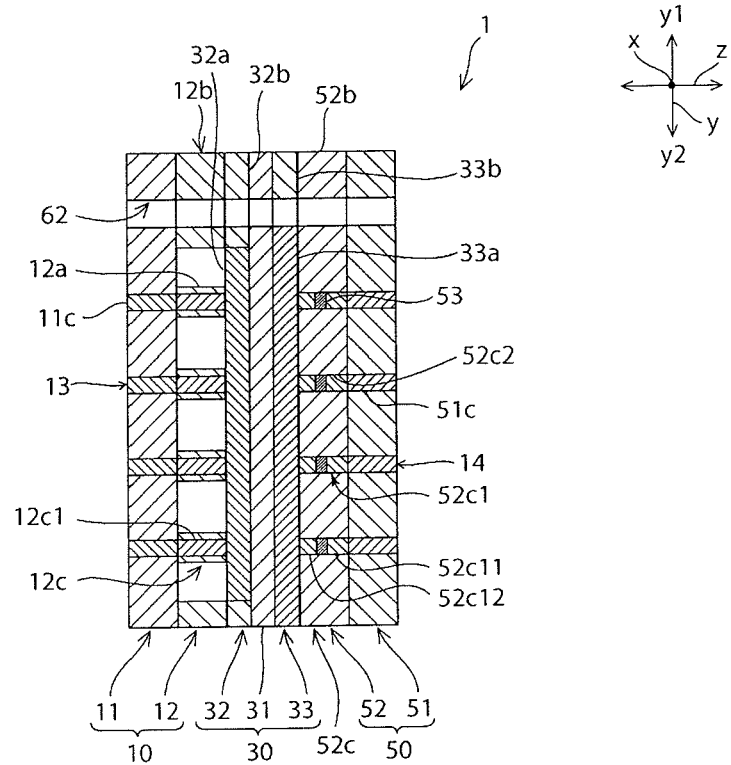
FIG. 12 is a schematic sectional view of a fuel cell according to a third embodiment.

FIG. 11 is a schematic sectional view of a fuel cell according to a second embodiment. FIG. 12 is a schematic sectional view of a fuel cell according to a third embodiment.

In the first embodiment, the interlayer 53 is arranged at an end of the via hole 52c2 on the fuel electrode 33a side. However, the present invention is not limited to this configuration. For example, as shown in FIG. 11, the interlayer 53 may be provided so as to cover a surface of the fuel electrode 33a on the interconnector 14 side. Specifically, the interlayer 53 in the second embodiment is provided so as to cover a surface of the fuel electrode layer 33 on the interconnector 14 side. In the second embodiment, the interlayer 53 is formed of a porous body. Therefore, a fuel gas passes through the interlayer 53 to be supplied to the fuel electrode 33a.

The interlayer may be arranged between the second linear projection and the fuel electrode, and the interlayer may not be arranged on a portion facing the channel of the fuel electrode.

Figure 13:
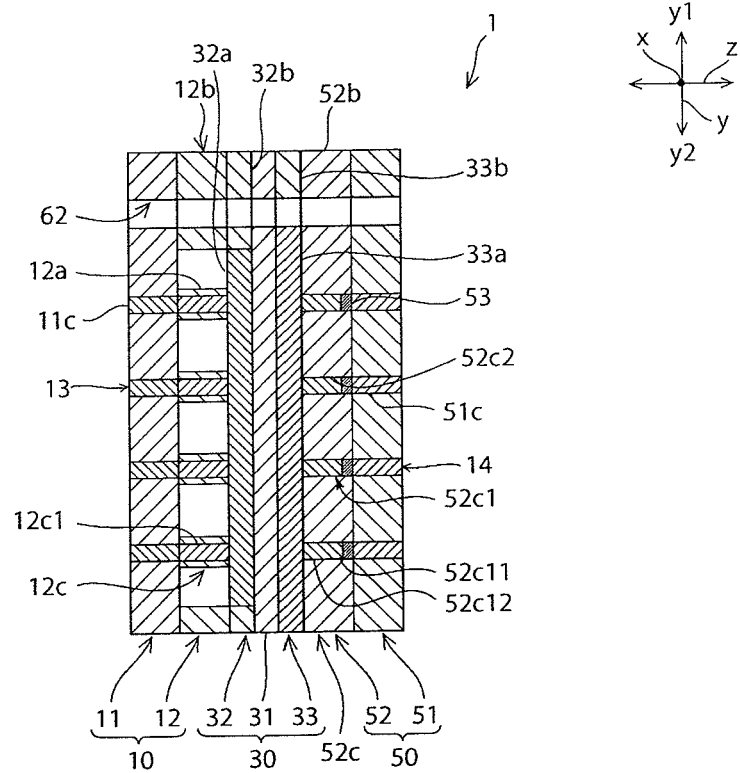
FIG. 13 is a schematic sectional view of a fuel cell according to a fourth embodiment.

As shown in FIG. 12, the interlayer 53 may be arranged at the central part of the via hole 52c2. As shown in FIG. 13, the interlayer 53 may be arranged at an end of the via hole 52c2 on the separator body 51 side. In each of third and fourth embodiments, a portion 52c11 of the interconnector 14 on the separator 50 side with respect to the interlayer 53 contains Ag or an Ag alloy. A portion 52c12 on the fuel electrode 33a side is formed of the same material as that of the fuel electrode 33a.

Example

A fuel cell having substantially the same configuration as that of the fuel cell according to the second embodiment was prepared under conditions shown below.
Constituent material of separator: YSZ
Constituent material of solid oxide electrolyte layer: YSZ
Constituent material of air electrode: LSM/YSZ
Constituent material of fuel electrode: Ni/YSZ (content of Ni in terms of oxide): 60% by mass)
Interconnector: Ag—Pd alloy
Constituent material of interlayer: Oxide containing Ni and Ti (molar ratio Ni:Ti=76:24)

Comparative Example

A fuel cell was prepared in the same manner as in Example except that an interlayer was not provided.

Evaluation

Figure 14:
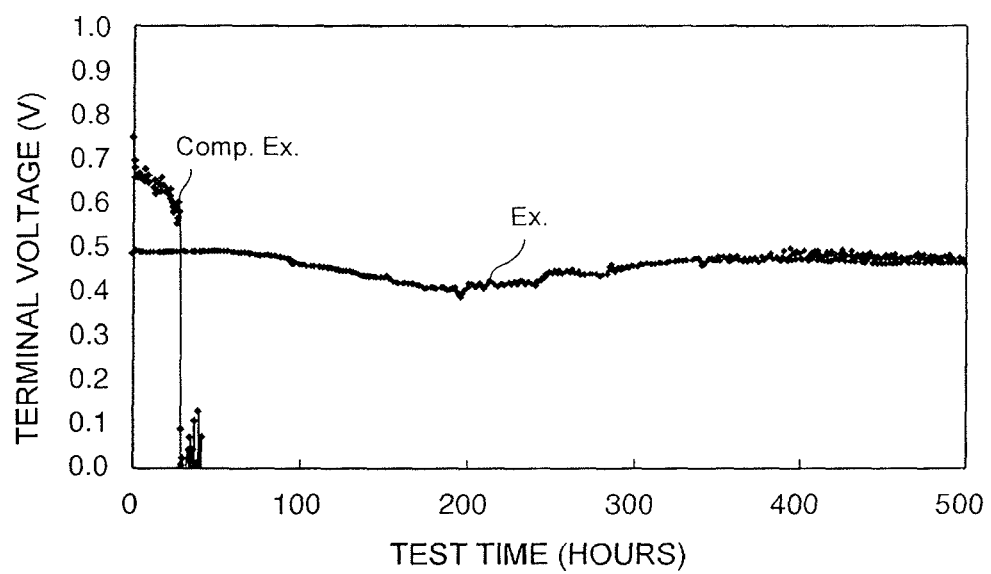
FIG. 14 is a graph showing the results of energization tests of fuel cells prepared, respectively, in Example and Comparative Example.

A 96% $H_2$-4% $H_2O$ gas and an oxidant gas were passed at 900° C. through the fuel cell prepared in each of Example and Comparative Example, thus causing the fuel cell to generate power. The results are shown in FIG. 14.

The data in Table 14 show that in the fuel cell prepared in Example, the voltage did not drop abruptly even when an energization test at a current density of 0.6 A/cm$^2$ was conducted for 500 hours.

On the other hand, the voltage dropped abruptly after about 24 hours as a result of conducting an energization test at a current density of 0.3 A/cm$^2$ in the fuel cell prepared in Comparative Example.

Experimental Example

Nickel oxide and titanium oxide were mixed and ground using water as a solvent under conditions 1 to 8 shown in Table 1. Thereafter, the mixture was dried and fired at 900° C. An organic binder was added to the obtained fired product to prepare a slurry. The slurry was molded into a sheet shape using a doctor blade method.

Next, a plurality of sheets thus obtained were laminated and pressure-bonded to prepare a rectangular prism having a length of 20 mm, a width of 5 mm and a thickness of 1 mm. This was fired to obtain a sample for measurement of conductivity. For the obtained sample of each condition, the conductivity was measured in an atmosphere of 96% $H_2$-4% $H_2O$ at 900° C. using a four-terminal method. The results are shown in Table 1 below.

TABLE 1

| | (% by mass) | | Molar ratio | Crystal phase | | Conductivity |
| | | | | | During | |
| Conditions | NiO | TiO$_2$ | Ni:Ti | During preparation | power generation | (S/cm) |
|---|---|---|---|---|---|---|
| 1 | 50 | 50 | 52:48 | NiTiO$_3$ | Ni, TiO$_2$ | 5 |
| 2 | 55 | 45 | 57:43 | NiO, NiTiO$_3$ | Ni, TiO$_2$ | 5 |
| 3 | 60 | 40 | 62:38 | NiO, NiTiO$_3$ | Ni, TiO$_2$ | 10 |
| 4 | 70 | 30 | 71:29 | NiO, NiTiO$_3$ | Ni, TiO$_2$ | 1000 |
| 5 | 75 | 25 | 76:24 | NiO, NiTiO$_3$ | Ni, TiO$_2$ | 2000 |

TABLE 1-continued

| | (% by mass) | | Molar ratio | Crystal phase | | Conductivity |
|---|---|---|---|---|---|---|
| | | | | | During | |
| Conditions | NiO | TiO$_2$ | Ni:Ti | During preparation | power generation | (S/cm) |
| 6 | 80 | 20 | 81:19 | NiO, NiTiO$_3$ | Ni, TiO$_2$ | 5000 |
| 7 | 90 | 10 | 91:9 | NiO, NiTiO$_3$ | Ni, TiO$_2$ | 5000 |
| 8 | 95 | 5 | 95:5 | NiO, NiTiO$_3$ | Ni, TiO$_2$ | 5000 |

From the results shown in Table 1, it is apparent that when the ratio of NiO:TiO$_2$ is 60% by mass:40% by mass to 95% by mass:5% by mass and the ratio of Ni:Ti is 62 mol:38 mol to 95 mol: 5 mol, a conductivity which causes no problem in practical use is obtained, and when the ratio of NiO:TiO$_2$ is 70% by mass: 30% by mass to 95% by mass:5% by mass and the ratio of Ni:Ti is 71 mol:29 mol to 95 mol:5 mol, a further high conductivity is obtained.

However, cracking tends to easily occur if the ratio of Ni is excessively high because the amount of volume change becomes excessively large when NiO is reduced to Ni. Therefore, the ratio of NiO is preferably 90% by mass or less, and the molar ratio Ni/Ti is preferably 81/19 or less.

DESCRIPTION OF REFERENCE SYMBOLS

1 . . . fuel cell
10 . . . first separator
11 . . . first separator body
11$a$, 11$b$ . . . through hole
11$c$ . . . via hole electrode
12 . . . first channel forming member
12$a$ . . . first channel
12$b$ . . . peripheral portion
12$c$ . . . first linear projection
12$c$1 . . . via hole electrode
12$d$ . . . through hole
13, 14 . . . interconnector
30 . . . power generating element
31 . . . solid oxide electrolyte layer
31$a$, 31$b$ . . . through hole
32 . . . air electrode layer
32$a$ . . . air electrode
32$b$ . . . peripheral portion
32$c$, 32$d$ . . . through hole
33 . . . fuel electrode layer
33$a$ . . . fuel electrode
33$b$ . . . peripheral portion
33$c$, 33$d$ . . . through hole
50 . . . second separator
51 . . . second separator body
51$a$, 51$b$ . . . through hole
51$c$ . . . via hole electrode
52 . . . second channel forming member
52$a$ . . . channel
52$b$ . . . peripheral portion
52$c$1 . . . via hole electrode
52$c$ . . . second linear projection
52$d$ . . . through hole
61 . . . oxidant gas channel
62 . . . fuel gas channel

The invention claimed is:

1. A fuel cell comprising:
a power generating element having a solid oxide electrolyte layer, a first electrode arranged on one principal surface of the solid oxide electrolyte layer, and a second electrode arranged on the other principal surface of the solid oxide electrolyte layer;
a separator arranged on the first electrode so as to form a channel facing the first electrode; and
an interconnector connected to the first electrode, wherein the first electrode contains Ni,
the interconnector comprises a Ag or Ag alloy portion, and
the fuel cell further comprises a Ni and Ti oxide containing interlayer arranged within via holes in the separator and between the Ag or Ag alloy portion of the interconnector and the first electrode.

2. The fuel cell according to claim 1, wherein the interlayer contains a NiTiO$_3$ crystal phase during manufacturing of the fuel cell.

3. The fuel cell according to claim 2, wherein the interlayer further contains a NiO crystal phase during manufacturing of the fuel cell.

4. The fuel cell according to claim 3, wherein the molar ratio of Ni and Ti (Ni:Ti) in the interlayer is in a range of 62:38 to 95:5.

5. The fuel cell according to claim 4, wherein the first electrode is yttria stabilized zirconia containing Ni, scandia stabilized zirconia containing Ni, Ni-containing ceria doped with Gd or Ni-containing ceria doped with Sm.

6. The fuel cell according to claim 5, wherein the interconnector has a Ag—Pd alloy portion.

7. The fuel cell according to claim 2, wherein the molar ratio of Ni and Ti (Ni:Ti) in the interlayer is in a range of 62:38 to 95:5.

8. The fuel cell according to claim 7, wherein the first electrode is yttria stabilized zirconia containing Ni, scandia stabilized zirconia containing Ni, Ni-containing ceria doped with Gd or Ni-containing ceria doped with Sm.

9. The fuel cell according to claim 8, wherein the interconnector has a Ag—Pd alloy portion.

10. The fuel cell according to claim 1, wherein the molar ratio of Ni and Ti (Ni:Ti) in the interlayer is in a range of 62:38 to 95:5.

11. The fuel cell according to claim 10, wherein the first electrode is yttria stabilized zirconia containing Ni, scandia stabilized zirconia containing Ni, Ni-containing ceria doped with Gd or Ni-containing ceria doped with Sm.

12. The fuel cell according to claim 11, wherein the interconnector has a Ag—Pd alloy portion.

13. The fuel cell according to claim 12, wherein the molar ratio of Ni and Ti (Ni:Ti) in the interlayer is in a range of 71:29 to 91:9.

14. The fuel cell according to claim 13, wherein the first electrode contains about 40% to 80% by mass of Ni in terms of oxide.

15. The fuel cell according to claim 1, wherein the molar ratio of Ni and Ti (Ni:Ti) in the interlayer is in a range of 71:29 to 91:9.

16. The fuel cell according to claim 15, wherein the first electrode is yttria stabilized zirconia containing Ni, scandia stabilized zirconia containing Ni, Ni-containing ceria doped with Gd or Ni-containing ceria doped with Sm.

17. The fuel cell according to claim 16, wherein the interconnector has a Ag—Pd alloy portion.

18. The fuel cell according to claim 1, wherein the first electrode is yttria stabilized zirconia containing Ni, scandia stabilized zirconia containing Ni, Ni-containing ceria doped with Gd or Ni-containing ceria doped with Sm.

19. The fuel cell according to claim 18, wherein the interconnector has a Ag—Pd alloy portion.

20. The fuel cell according to claim 1, wherein the interconnector has a Ag—Pd alloy portion.

* * * * *